Dec. 8, 1936.  A. DAVIS, JR  2,063,727
APPARATUS FOR TRANSPORTATION AND DELIVERY OF BEER
Filed April 1, 1933  3 Sheets-Sheet 1

INVENTOR
Augustine Davis, Jr.
BY
ATTORNEY

Dec. 8, 1936.    A. DAVIS, JR    2,063,727
APPARATUS FOR TRANSPORTATION AND DELIVERY OF BEER
Filed April 1, 1933    3 Sheets-Sheet 2

INVENTOR
Augustine Davis, Jr.
BY
ATTORNEY

Dec. 8, 1936.  A. DAVIS, JR  2,063,727
APPARATUS FOR TRANSPORTATION AND DELIVERY OF BEER
Filed April 1, 1933   3 Sheets-Sheet 3

Patented Dec. 8, 1936

2,063,727

UNITED STATES PATENT OFFICE 2,063,727

APPARATUS FOR TRANSPORTATION AND DELIVERY OF BEER

Augustine Davis, Jr., Cincinnati, Ohio

Application April 1, 1933, Serial No. 663,882

7 Claims. (Cl. 225—17)

This invention relates to the transportation and delivery of liquids, and more particularly beer.

An object of the invention is to provide an improved apparatus and method for transporting and delivering beer, and the invention comprises novel features and combinations of elements to make the transportation and delivery of beer more economical and satisfactory.

A more particular object of the invention is to provide a motor truck or trailer with a tank, or plurality of tanks, having means for maintaining pressure on the beer, and containing vertically movable buoyant partition means for preventing splashing of the beer during transit.

Other objects and features of the invention relate to the improved method and means for delivering beer from the tanks on the vehicle to the customer's tank, and for filling the vehicle tanks.

Other objects, features and advantages of the invention will appear or be pointed out as the specification proceeds.

In the accompanying drawings, forming part hereof:

Figure 1:
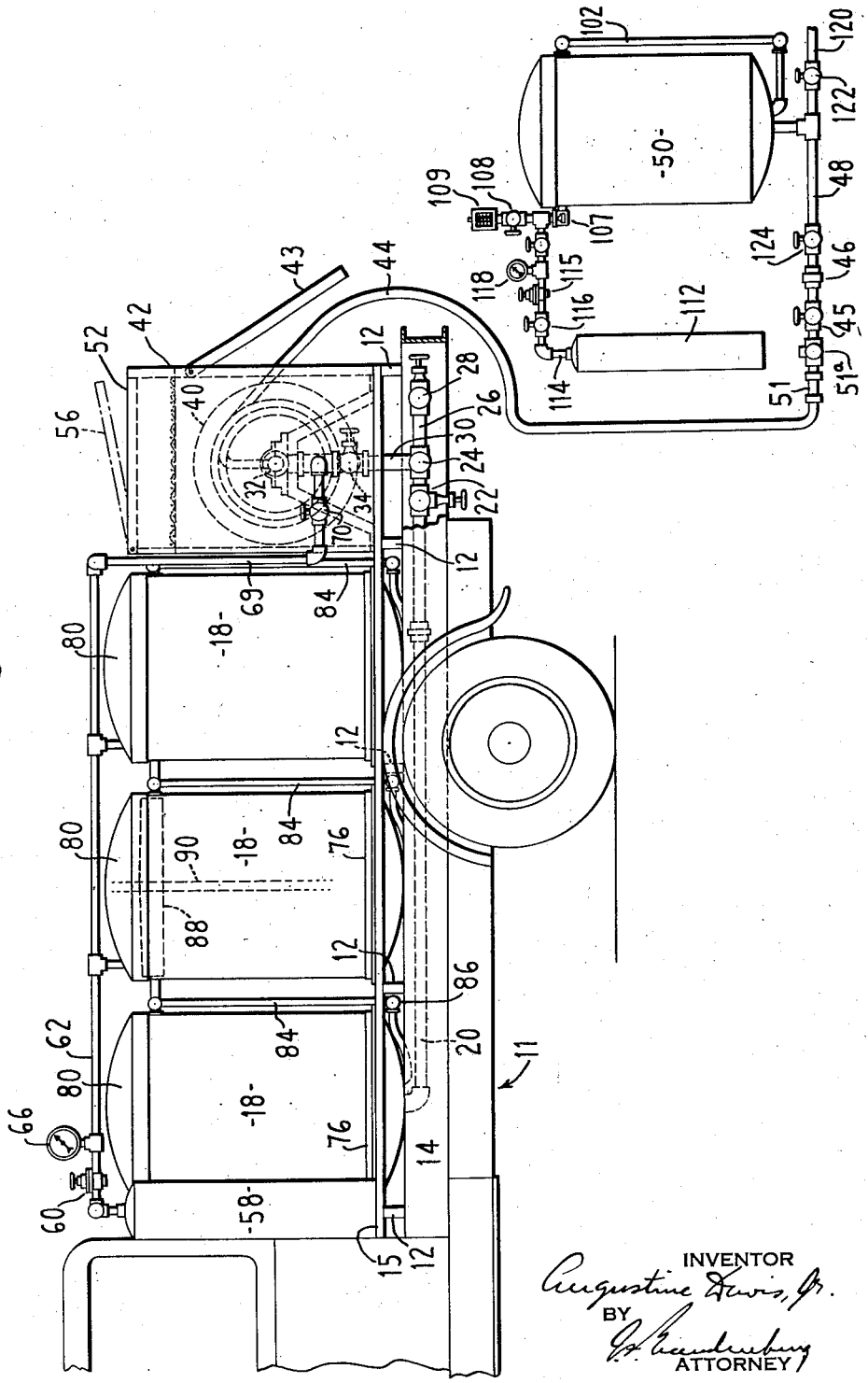
Fig. 1 is a fragmentary side elevation of a beer truck made in accordance with the invention and shown with a hose line connected to a customer's tank.

A motor truck 11 has cross beams 12 supported by longitudinal sills 14 which rest on the truck chassis. A platform 15 is supported by the cross beams 12.

Upright tanks 18 are connected to the platform. The tanks are preferably cylindrical. The truck is shown with two rows of tanks (Fig. 2), each row including three tanks, but more or fewer tanks can be used.

A delivery conduit or pipe 20 connects with the bottom of each of the tanks 18, and communicates, through a hand-operated valve 22, with a manifold 24, which extends transversely across the truck.

The manifold 24 has a filling connection 26. A shut-off valve 28 in the filling connection is closed at all times except when the tanks are being filled. A delivery pipe 30 connects the manifold 24 with one end of a hollow shaft 32. A shut-off valve 34 is located in the delivery pipe. The piping 20, etc., is preferably heat insulated. For simplicity, this has not been illustrated.

The hollow shaft 32 is rotatably supported in bearings 36 (Fig. 2), and the delivery pipe 30 connects with the hollow shaft 32 through a stuffing-box 38 which permits the shaft to rotate.

Referring again to Fig. 1, a hose reel 40 is secured to the shaft 32. The reel is enclosed by a heat insulating housing 42, which has a door 43. A hose 44 is fastened at one end to the shaft 32 and communicates through an opening with the hollow interior of the shaft. At the other end of the hose there is a shut-off valve 45 and a coupling 46 for connection to a filling pipe 48 of a customer's tank 50. The hose can be used as either a "wet" or a "dry hose". When used as a "wet hose", the flow of beer is cut off by the valve 45, and the hose is kept full of beer between deliveries. When the hose is used as a "dry hose", gas pressure is used to force the beer from the hose after each delivery to a customer. The beer is visible through a window or glass section 51 near the end of the hose, and by watching this glass section an operator can tell when the hose is empty. A valve 51$^a$ can be opened to permit gas to escape from the hose when first connected to a customer's tank.

If some of the tanks 18 are to be used for light beer and others for dark, two hose reels can be connected to the manifold 24, one hose being used when the light beer tanks are in communication with the manifold and the other when delivering from the tanks containing dark beer.

A chest 52 located above the housing 42 can be filled with ice to keep the interior of the housing 42 cold, so that any beer in the hose 44, which is wound on the reel 40 when not in use, will not sour. The ice chest is heat insulated and is filled through a door 56.

Figure 2:
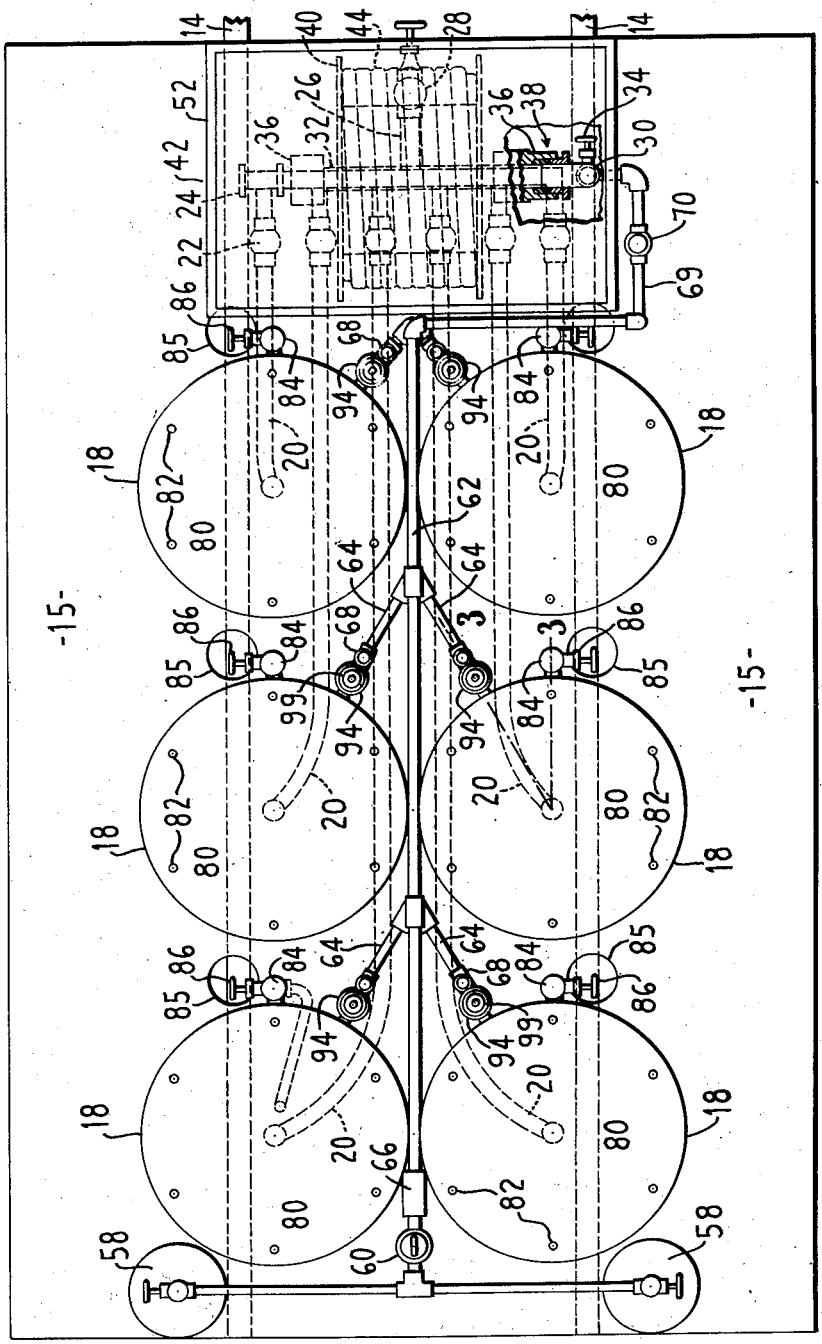
Fig. 2 is an enlarged top plan view of a portion of the apparatus shown in Fig. 1.

Carbon dioxide is stored under high pressure in cylinders 58 on the front end of the platform. Two such cylinders are illustrated in Fig. 2, but one or more than two can be used. Both of the cylinders 58 communicate, through a pressure regulator 60, with a manifold 62. This manifold has branches 64 leading to the respective tanks 18. The pressure regulator 60 is manually adjustable to control the pressure in the manifold. A gauge 66 indicates the manifold gas pressure, which is the same as the pressure on the beer in the tanks 18. Each of the tanks 18 has a hand-operated valve 68 for cutting off communication with the manifold 62.

A pipe 69 connects the manifold 62 with the delivery pipe 30. A shut-off valve 70 in the pipe 69 is always closed except when gas is to be used to blow beer out of the hose.

Figure 3:
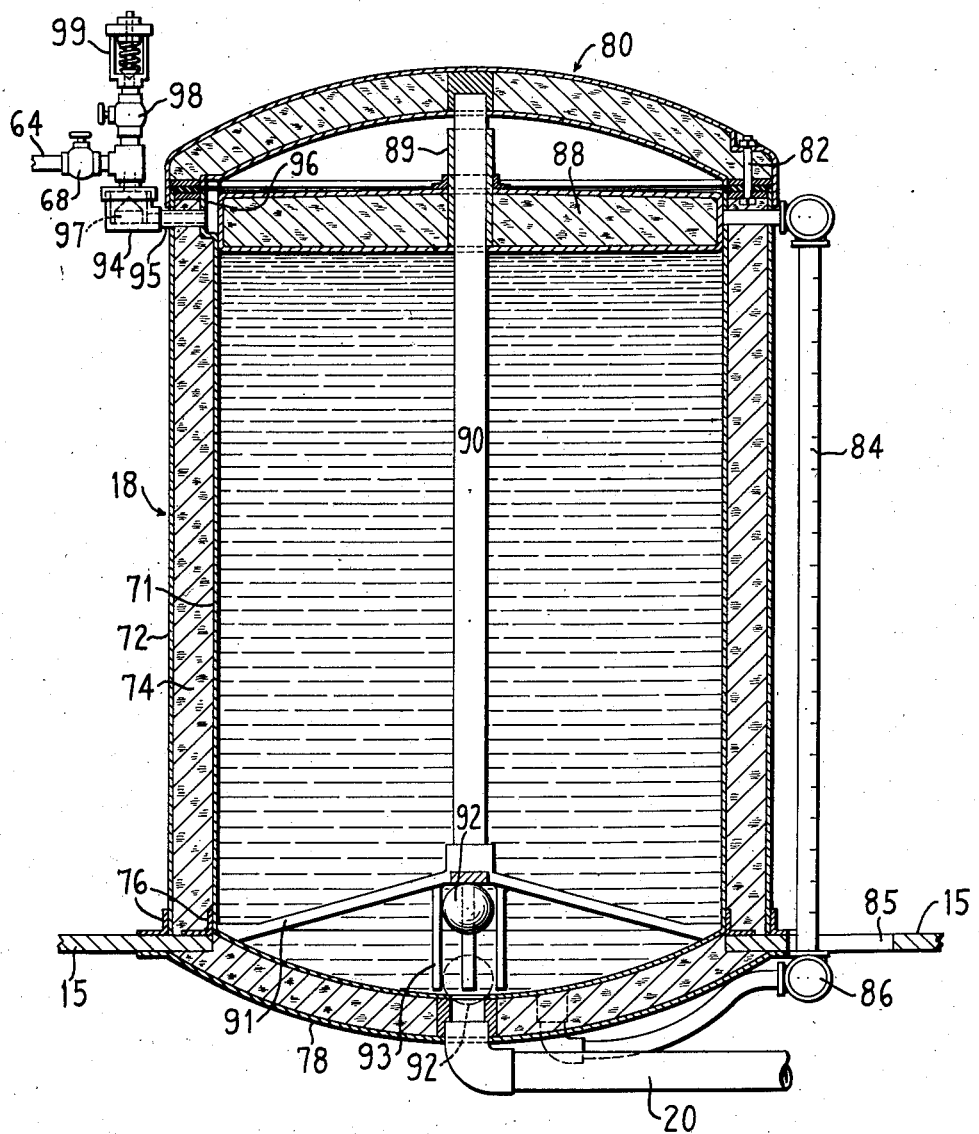
Fig. 3 is an enlarged longitudinal sectional view of the truck tanks, taken on the line 3—3 of Fig. 2.

One of the tanks 18 is shown in section in Fig. 3. The tank has an inside sheet-metal wall 71, preferably of stainless steel, an outer sheet-metal wall 72, and heat insulating material 74 between these walls. The tank is secured to the platform 15 by angles 76 fastened to the platform and to the walls 71 and 72. The tank has a bottom 78 which is slightly dished and is constructed of sheet-metal separated by heat insulating material.

The tank 18 has a removable top 80, which is fastened to the tank by bolts 82. The top is made removable to facilitate cleaning. A graduated gauge glass 84 is connected to each tank for indicating the level of the beer. The platform 15 has openings 85 permitting access to shut-off valves 86 at the lower ends of the gauge glasses 84.

A vertically movable buoyant partition comprising a float 88 fits inside of each tank 18. This float is a substantially close fit in the tank but is freely movable in a vertical direction with changes in the level of the liquid in the tank. The float has a center bearing 89 which slides freely on a guide rod 90. The axis of the guide rod 90 is substantially coincident with the axis of the tank 18, and the guide rod holds the float normal to the tank axis when the truck is on a hill or on the side of a crowned road and the tank 18 is tilted. The bearing 89 is long enough to prevent it from binding on the guide rod under such conditions.

The guide rod 90 is secured at its lower end to a spider 91, which is supported by the bottom of the tank. The upper end of the guide rod 90 fits into a socket in the top 80 of the tank. The spider is removable to facilitate cleaning of the tank.

A ball float valve 92 closes the entrance to the pipe 20 when the tank 18 is substantially empty and prevents the gas above the beer from entering the pipe 20. The float valve 92 is held in position over the pipe 20 by vertical guides 93 which extend downwardly from the spider 91. When the tank contains beer, the float valve 92 occupies the full-line position shown in Fig. 3. As the beer flows out of the tank, the float valve moves into the position indicated by dotted lines.

The manifold branch 64 communicates with the tank 18 through a valve casing 94 and pipe 95. The inside wall of the tank 18 has a recess 96 at its upper end, and the pipe 95 opens into this recess.

The valve casing 94 contains a float valve 97, which drops open by gravity when there is no liquid in the valve casing, but which floats into closed position whenever the tank 18 is filled to the level of the pipe 95 so that beer enters the valve casing 94.

The upper end of the valve casing 94 communicates through a shut-off valve 98 with a pressure relief valve 99.

The customer's tank 50, shown in Fig. 1, has a gauge glass 102 which shows the liquid level in the tank. A float valve 107, shut-off valve 108 and relief valve 109 are similar to the corresponding valves 97, 98 and 99, respectively, on the tanks 18 of the truck, but the loading on the relief valve 109 is ordinarily less than that of the relief valves 99 of the truck. A compressed gas storage cylinder 112 communicates with the tank 50 through piping 114, a pressure regulator 115 and a shut-off valve 116. The regulator 115 is manually adjustable to control the pressure of the gas supplied to the tank 50, and a gauge 118 is connected to the piping 114 to indicate the pressure on the tank side of the pressure regulator 115.

The customer draws beer from the tank 50 through a service line 120. This service line is equipped with a shut-off valve 122. The filling pipe 48 is equipped with a similar shut-off valve 124.

The operation of the invention is as follows:

When the tanks 18 are to be filled at the brewery, the valve 28 is opened and beer is forced through the filling pipe 26 into the manifold 24, from which it flows through the open valves 22 and pipes 20 to the tanks. The valve 34 is kept closed while the tanks are being filled.

As the beer level in each of the tanks 18 rises, the float 88, shown in Fig. 3, rises, and the gas above the beer is compressed. The valve 98 is open when the tanks are being filled, and excessive pressure of the gas compressed by the rising beer is relieved by the valve 99. The loading of this relief valve 99 determines the maximum pressure which must be overcome when filling the tanks.

When the level rises to the pipe 95, beer flows into the valve casing 94 and causes the float valve 97 to rise against its seat. This automatic closing of the float valve 97 prevents beer from being forced out through the relief valve 99.

After the tanks 18 are full, the valve 28 (Fig. 1) is closed. The valves 22 are also closed, unless the tanks are to be emptied simultaneously.

During transit, the float 88 in each tank prevents splashing of the beer, and this function of the float becomes increasingly important after part of the beer has been delivered and the level in the tank correspondingly lowered.

When beer is to be delivered from the truck to a customer's tank, one of the valves 22 is opened so that its associated tank 18 is in communication with the manifold 24. The door 43 is opened and the hose 44 unreeled until the coupling 46 reaches the filling pipe 48 of the customer's tank. The coupling 46 is connected with the filling pipe 48, and the valves 34 and 45 are then opened to permit beer to flow from the manifold 24, through the delivery pipe 30, hollow shaft 32 and hose 44, to the filling pipe.

Pressure on the beer in the truck tanks 18 is greater than the gas pressure in the customer's tank, and this pressure difference forces the beer out of the truck tank. Gas from the cylinders 58 enters the tank 18 through the manifold branch 64, valve casing 94 and pipe 95. This gas from the cylinders 58 has enough pressure to force beer into any customer's tank.

Gas can be conserved by closing the valve 68 before the required amount of beer has been delivered and allowing expansion of the gas in the tank 18 to force out the final quantity of beer. The gas pressure in the manifold and branches 64 can be controlled by adjusting the pressure regulator 60.

The flow of beer to the hose 44 can be cut off at any time by closing the valve 34. The beer remaining in the hose can be forced out by opening the valve 70 and allowing gas from the manifold 62 to blow through the hose. This is an effective method for removing beer from the coils of the hose on the reel.

Although the invention is intended primarily for the transportation and delivery of beer, it will be understood that it can also be used with other liquids. Different tank constructions can be used in place of that shown and other modifications can be made, and various features of the invention used with or without other features, without departing from the invention as defined in the claims.

I claim:

1. In a delivery truck for transporting beer under pressure, a tank, a conduit connecting with the upper end of the tank for supplying gas under pressure to said tank, a relief valve loaded to prevent the escape of gas from the upper end of the tank unless the gas pressure exceeds a given value, valve means operated by the beer for preventing beer from flowing out of the tank through the gas conduit and from reaching said relief valve, a pipe connecting with the lower end of the tank for withdrawing beer from said tank, and a float valve independent of the other valve means and of such a character that it closes the pipe, as the level of beer approaches the pipe, and prevents the escape of gas from the lower end of the tank.

2. A beer truck comprising a platform, a plurality of substantially cylindrical beer tanks mounted on the platform with their axes substantially vertical, a beer manifold, valved pipes for selectively connecting the respective tanks with the manifold, a hose reel rotatably supported on the truck by a hollow axle, piping for supplying beer from the manifold to the hollow axle, a hose adapted to be wound on the reel, means connecting one end of the hose with the hollow axle, and a heat-insulated box housing said reel, axle, and hose to keep them cool between successive deliveries when the truck is operating over a delivery route.

3. A beer truck comprising a platform, a plurality of substantially cylindrical beer tanks mounted on the platform with their axes substantially vertical, a float in each tank to prevent substantial splashing of the beer in transit, a gas manifold having valved branches connected with each of the tanks, a carbon dioxide storage cylinder carride by the truck, a pressure regulator through which gas from the cylinder is supplied to the gas manifold, and automatic valve means in each branch to prevent beer in the tank from entering that branch.

4. A vehicle for transporting and delivering beer or other liquids under pressure, including a number of tanks in which the beer is carried, means connected with the tanks for maintaining gas pressure on the beer while in the tanks, a common delivery line communicating with all of the tanks, and float-operated valve means in each of the tanks for shutting off that tank from communication with the delivery line as soon as the tank becomes empty so that gas from the tank can not discharge into the delivery line.

5. Apparatus for transporting and delivering beer or other liquids under pressure comprising a vehicle, a plurality of tanks carried by the vehicle, a manifold connecting with all of the tanks at their upper ends for supplying gas to said tanks under pressure, a float in each tank substantially covering the surface of the beer to prevent the beer from splashing during transit, and adapted to be supported by the buoyancy of the beer, pipe connections through which beer is forced into any or all of the tanks at their lower ends and under the floats, and automatic valve mechanism for closing the gas supply connection at the top of each tank as that tank becomes full, to prevent beer from being forced into the manifold.

6. In a beer truck or trailer, a heat insulated tank in which the beer is carried during transit, a hose reel rotatably supported by the truck on a hollow axle and enclosed in a heat insulated hose box, means for refrigerating the box, a pipe through which beer flows from the tank to the hollow axle, and a hose connected with said hollow axle and adapted to be wound on the reel in the refrigerated hose box to maintain the hose at a low temperature and preserve any beer remaining in said hose after a delivery from the tank.

7. Apparatus for transportation of beer comprising a tank having a removable top, a float for substantially covering the surface of the beer to prevent splashing during transit, a vertical guide rod passing through the float, and means for holding the guide rod centered in the tank including a spider resting on the bottom of the tank and contacting with the sides to prevent lateral displacement, the spider and guide rod being held against vertical displacement by contact of the guide rod with the top when said top is in place on the tank.

AUGUSTINE DAVIS, Jr.